United States Patent [19]

Gerbig, Jr.

[11] Patent Number: 4,874,921

[45] Date of Patent: Oct. 17, 1989

[54] PORTABLE AUXILIARY AUTOMOBILE HEATER

[76] Inventor: Barry V. Gerbig, Jr., P.O. Box 2712, Middlebury, Vt. 05753

[21] Appl. No.: 64,082

[22] Filed: Jun. 19, 1987

[51] Int. Cl.⁴ .................................................. B60L 1/02
[52] U.S. Cl. ................................. 219/202; 237/12.3 A
[58] Field of Search ................. 237/12.3 A, 12.3 B, 237/12.3 R; 219/202, 203; 98/2.05, 2.08; 165/41

[56] References Cited

U.S. PATENT DOCUMENTS

| | | | |
|---|---|---|---|
| 4,027,727 | 6/1977 | Pullens | 62/236 X |
| 4,034,204 | 7/1977 | Windsor et al. | 219/202 X |
| 4,293,759 | 10/1981 | Higgins | 237/12.3 A |

Primary Examiner—Henry A. Bennet
Attorney, Agent, or Firm—Leon Gilden

[57] ABSTRACT

A portable compact auxiliary automotive heater is provided for timed heating of an automotive interior including selective AC/DC power input wiring enabling initial pre-heating of an automotive interior prior to use by AC power and switching to DC power to continuously warm an automotive interior.

1 Claim, 1 Drawing Sheet

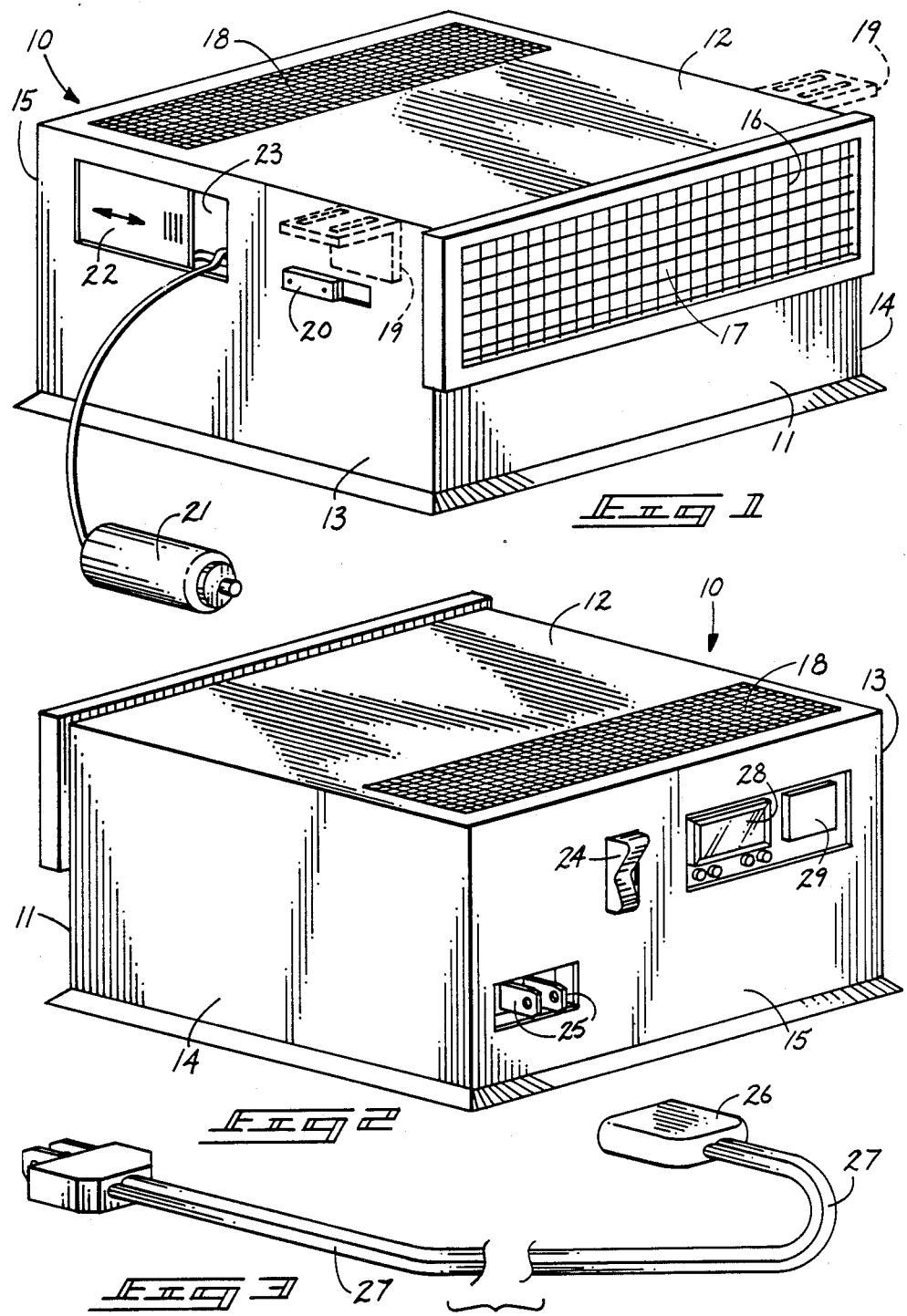

PORTABLE AUXILIARY AUTOMOBILE HEATER

BACKGROUND OF THE INVENTION

1. Field of the Invention

The present invention relates to automotive pre-heating devices, and more particularly pertains to a new and improved automotive pre-heating device which may selectively employ AC current or DC current to insure adequate and continuous warming of an automotive interior.

2. Description of the Prior Art

The use of automotive pre-heating apparatus is well known in the prior art. These devices have undertaken a variety of configurations to enable automotive pre-heating of either an automotive interior, automotive components, or a combination of both. It may be appreciated that shortcomings of the prior art have heretofore not enabled continuous warming of an automotive interior once a user has removed an automobile proximate an auxiliary power source such as AC current supplied from a dwelling. An example of such pre-heating devices is set forth in U.S. Pat. No. 3,870,855 to Edlund. This patent discloses a combination battery charger, motor heater and passenger compartment heater, all of which are activated by a timer circuit drawing power from an outside source exclusively. This system, like others of this category, are intended to be used with auxiliary power sources only. While being a partial solution for engine compartment pre-heating as well as automotive component pre-heating, the Edlund patent does not enable the continuous warming of an automotive interior or passenger compartment until such time as engine heat may be directed to the interior thereof. Another automotive passenger pre-heating device of similar intent is to be found in U.S. Pat. No. 4,350,287 to Richards. The Richards' patent addresses the pre-heating of an automotive passenger compartment by providing a separate automotive pre-heater battery that, in this instance, may be activated by a remote transmitter arrangement. Adequate circuitry is provided that upon the appropriate engine temperature being attained to enable warming of the passenger compartment by the automotive heater itself, a thermastic switch is closed to shut the auxiliary automotive warming apparatus off. Again, the problem of continuous warming is not fully addressed in this patent as there remains a problem of maintaining auxiliary pre-heater output due to limitations of the separate battery associated therewith. A further example of automotive passenger compartment pre-heating may be found in U.S. Pat. No. 4,034,204 to Windsor. Essentially the Windsor patent is an auxiliary automotive heating device with a self-contained heating element operable through an adjustable thermostat unit to provide heat to an automotive interior. The Windsor patent, as does the entire class of patents of this category, fails to provide a means to provide continuous pre-heating of an automotive interior by initially drawing current, not from the automotive battery itself but from an auxiliary source such as AC current imparticular and subsequently DC current, from the automotive electrical circuit.

Other U.S. patents are available to provide teaching of warming of various automotive components, such as U.S. Pat. No. 3,594,547, U.S. Pat. No. 3,673,379, U.S. Pat. No. 3,835,290, U.S. Pat. No. 4,208,570, U.S. Pat. No. 4,378,486, U.S. Pat. No. 4,506,138, U.S. Pat. No. 4,520,603, and U.S. Pat. No. 4,034,204. While the aforenoted patents are each representative of automotive heating devices, there is continuing need for a new and improved automotive pre-heating device that addresses the problem of continuous warming prior to and subsequent to use of an automobile by an individual, particularly during inclement weather.

SUMMARY OF THE INVENTION

In view of the foregoing disadvantages inherent in the known types of automotive heater now present in the prior art, the present invention provides an improved automotive heater. As such, the general purpose of the present invention, which will be described subsequently in greater detail, is to provide a new and improved automotive heater which has all the advantages of the prior art automotive heaters and none of the disadvantages.

To attain this, the present invention sets forth a compact portable auxiliary automotive heater provided with enabling circuitry to utilize both AC current and DC current interchangeable to provide a continuous flow of heated air. A timing device is incorporated in the system to enable programming of the apparatus for utilization at pre-selected times. Switching is available enabling adaption of my pre-heating apparatus to accept either AC or DC current in a manner as to provide continuous heating of automotive passenger compartment in addition to a conventional on/off switch to discontinue power, if so desired.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable automotive auxiliary heater which has all the advantages of the prior art auxiliary automobile pre-heater and none of the disadvantages.

It is another object of the present invention to provide a new and improved portable automotive auxiliary pre-heater which may be easily and efficiently manufactured and marketed.

It is a further object of the present invention to provide a new and improved automotive auxiliary pre-heater which is of a durable and reliable construction.

An even further object of the present invention is to provide a new and improved portable automotive auxiliary pre-heater which is susceptible of a low cost of manufacture with regard to both materials and labor, and which accordingly is then susceptible of low prices of sale to the consuming public, thereby making such heaters economically available to the buying public.

Still yet another object of the present invention is to provide a new and improved portable automotive auxiliary heater which provides in the apparatuses and methods of the prior art some of the advantages thereof, while simultaneously overcoming some of the disadvantages normally associated therewith.

Still another object of the present invention is to provide a new and improved automotive auxiliary pre-heater of compact portable pre-heater universally adaptable to a variety of automobiles.

Yet another object of the present invention is to provide a new and improved portable auxiliary automotive heater providing continuous heating of an automotive passenger compartment.

Even still another object of the present invention is to provide a new and improved portable auxiliary automotive heater that utilizes either AC or DC electrical current in a pre-selective manner enabling continuous operation of said pre-heater.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of the automotive pre-heater apparatus of the present invention illustrating the forward side, ride side and top portion of the apparatus.

FIG. 2 is an isometric rear illustration of the present invention illustrating the left side, rear, and top portion of the apparatus.

FIG. 3 is an isometric illustration of the AC power supply line forming a part of the present invention.

DESCRIPTION OF THE PREFERRED EMBODIMENT

With reference now to the drawings, and in particular to FIGS. 1, 2 and 3 thereof, a new and improved portable auxiliary automotive heater embodying the principles and concepts of the present invention and generally designated by the reference numeral 10 will describe.

More specifically, it will be noted that a portable auxiliary automotive heater 10 essentially comprises a portable cabinet-like structure formed of a bottom and forward face 11, top face 12, right side 13, left side 14, and rear face 15. Securely positioned to forward face 11 is a face plate grill 16 sandwiching grill cloth fabric 17 positioned between forward face 11 and said face plate grill 16. Accordingly, the face plate grill cloth formed of any suitable material, such as synthetic, or natural fiber, will be adequate to provide desirable filtration of dust or contaminants normally found within an automotive interior environment. A companion air intake portion 18 is also provided and may so be assembled with appropriate filtration fabric material, such as grill cloth material 17. Use of grill cloth material is optional in the operation of my apparatus but is useful in minimizing circulation of airborn contaminants, such as dust, etc. Positioned within heater 10 is a fan member and heating element (not shown) of conventional and well known construction providing a directed heated air as noted above.

Secured to sides 13 and 14 are optional brackets 19 enabling permanent securement of my automotive heating apparatus to the automobile, such as under the dash board for example. The positioning and configuration of such bracketry is subject to variance in design from one automobile to the next, dependent on the automobile's interior configuration and geometry.

Conveniently positioned upon side wall 13 is a sliding AC/DC switch 20 enabling selective conversion from AC to DC power, as desired. DC power is supplied directly from the automobile's battery and charging system and directed to my invention by convenient means of a conventional cigarette lighter adapter for readily securement within an automobile's cigarette lighter. The cigarette lighter adapter 21 is normally housed within compartment 23 enclosed by a sliding door 22 such that when transport of my heater 10 is desired, my automotive heater conveniently secures the cigarette lighter adapter and attendant wiring with compartment 23. If a permanent installation of heater 10 is desired. In lieu of cigarette lighter adapter 21, automotive pre-heater 10 may be "hard wired" into the respective automobile as an option. It is to be understood that conventional electrical circuitry (not shown) of a myriad of configurations well known in the art may be utilized to control my invention.

With reference to FIG. 2, rear face 15 of heater 10 has positioned thereon a conventional on/off switch of a toggle type that enables discontinuing power to the instant invention when deemed necessary. Positioned therebelow is an AC plug 25 adapted for securement to AC connector 26 wherethrough AC power supply cord 27 may receive power to the instant invention from an external source, such as a residential dwelling.

Secured to forward face 15 is a timer clock assembly 28 of convenient digital configuration of low voltage requirement enabling use of a common wrist watch type battery housed within battery housing 29.

As to the manner of usage and operation of the present invention, the same should be apparent from the above description but will be briefly discussed. A user will connect AC connector 26 to AC plug 25 positioned on rear face 15, and supply thereto conventional AC convenient to my device from a residential-type dwelling, for example. Switch 24 is normally positioned on the off position mode and cigarette lighter adapter 21 is inserted within the automobile's cigarette lighter receptacle. AC switch 20 is positioned to the AC mode whereupon timer clock 28 is pre-set by a user to energize my automotive heater at a pre-selected time.

Switch 24 is then switched to the "on" position whereupon when such pre-selected time is attained, my automotive heater will be activated and supply heat to the automobile's passenger compartment via base plate grill 16. When a user of said automobile enters the compartment and starts the automobile AC switch 20 will be moved to the DC position for continuous heating of the automotive interior. AC connector is thereupon removed from my automotive heater 10 for subsequent use whereupon a user may then proceed in the automobile and receive continuous warmth from the automotive heater 10 until such time as the engine may provide such warming whereupon said user may disengage my automotive heater by moving switch 24 to the off position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States if as follows:

1. A new and improved portable automotive heater for pre-heating a passenger compartment of an automobile comprising a housing further including therein,
    (a) a heated air outlet means, and
    (b) an air intake means, and
    (c) a timing mechanism wherein said timing mechanism includes a digital timer/clock including an independent power supply means independent of a plural selective electrical power supply means for providing electrical energy to said timing mechanism, and
    (d) said plural selective electrical power supply means including an AC power input supply means and a DC electrical input supply means for providing electrical power to said automotive heater when said timing mechanism permits flow of electrical power to thereby provide heated air directed from said outlet means, and
    said plural selective power supply means further includes an AC/DC switch enabling selective use of either said AC electrical power supply means or DC power supply means to direct electrical power to said automotive heater, and
    a compartment is provided in said housing for storage for said DC power supply means, and
    a selective on/off switch provided on said housing enabling selective energization or de-energization of power to said portable automotive heater, and
    bracketry means is positioned on said automotive pre-heater housing for attachment of said automotive heater to a passenger compartment of an automobile.

* * * * *